(12) United States Patent
Kim et al.

(10) Patent No.: US 12,433,964 B2
(45) Date of Patent: Oct. 7, 2025

(54) ANTIVIRAL AND ANTIBACTERIAL DISINFECTION AERO-SOLUTION USING EDIBLE FOOD DYES

(71) Applicant: Purdue Research Foundation, West Lafayette, IN (US)

(72) Inventors: Young L Kim, West Lafayette, IN (US); Jung Woo Leem, West Lafayette, IN (US); Hee-Jae Jeon, West Lafayette, IN (US); Yuhyun Ji, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 1066 days.

(21) Appl. No.: 17/314,908

(22) Filed: May 7, 2021

(65) Prior Publication Data

US 2021/0346531 A1 Nov. 11, 2021

Related U.S. Application Data

(60) Provisional application No. 63/058,433, filed on Jul. 29, 2020, provisional application No. 63/021,569, filed on May 7, 2020.

(51) Int. Cl.
*A61L 2/08* (2006.01)
*A61L 2/00* (2006.01)
*A61L 9/14* (2006.01)
*A61L 9/18* (2006.01)

(52) U.S. Cl.
CPC .......... *A61L 2/0088* (2013.01); *A61L 2/0052* (2013.01); *A61L 2/0076* (2013.01); *A61L 9/145* (2013.01); *A61L 9/18* (2013.01)

(58) Field of Classification Search
CPC .................................. A61L 2/088; A61L 2/22
See application file for complete search history.

(56) References Cited

U.S. PATENT DOCUMENTS

| 8,142,715 | B2 | 3/2012 | Curry et al. | |
|---|---|---|---|---|
| 8,974,833 | B2 | 3/2015 | Piergallini et al. | |
| 2003/0194433 | A1* | 10/2003 | Hei | C10M 173/025 |
| | | | | 514/297 |
| 2005/0139239 | A1* | 6/2005 | Prae | E03C 1/05 |
| | | | | 134/34 |

(Continued)

OTHER PUBLICATIONS

Watt et al., Hydrogen peroxide poisoning, Toxicological Reviews 23, 51-57, 2004.

(Continued)

*Primary Examiner* — Donald R Spamer
(74) *Attorney, Agent, or Firm* — Piroozi-IP, LLC

(57) ABSTRACT

A whole-body or whole-room voluminous antiviral and antibacterial airborne disinfection system is disclosed which includes a sterilization chamber, including a nozzle disposed in the sterilization chamber, a tank disposed outside the sterilization chamber, the tank is adapted to hold a photosensitizer fluid of edible food dyes, a light source within the sterilization chamber adapted to flood the sterilization chamber with light; and a nozzle adapted to release the photosensitizer fluid aerosols and generate reactive oxygen species in a fog-like dispersion.

11 Claims, 15 Drawing Sheets
(14 of 15 Drawing Sheet(s) Filed in Color)

(56) References Cited

U.S. PATENT DOCUMENTS

| | | | |
|---|---|---|---|
| 2007/0224080 A1* | 9/2007 | Sparks | B05B 17/0615 239/102.1 |
| 2008/0051736 A1* | 2/2008 | Rioux | A61L 29/14 604/265 |
| 2012/0294760 A1* | 11/2012 | Humele | A61L 2/10 422/186.05 |
| 2013/0129567 A1* | 5/2013 | Gray | A61L 2/10 422/186.3 |

OTHER PUBLICATIONS

Lopes et al., Ultraviolet radiation on the skin: A painful experience?, CNS Neuroscience & Therapeutics 22, 118-126, 2016.

Sharma, Aggregation and toxicity of titanium dioxide nanoparticles in aquatic environment—A Review, Journal of Environmental Science and Health Part A—Toxic/Hazardous Substances & Environmental Engineering 44, 1485-1495, 2009.

Derosa et al., Photosensitized singlet oxygen and its applications, Coordination Chemistry Reviews 233, 351-371, 2002.

Hamblin et al., Photodynamic therapy: a new antimicrobial approach to infectious disease?, Photochemical & Photobiological Sciences 3, 436-450, 2004.

Lutkus et al., Singlet oxygen quantum yields determined by oxygen consumption, Journal of Photochemistry and Photobiology A—Chemistry 378, 131-135, 2019.

Silva et al., Antimicrobial photodynamic inactivation mediated by Rose Bengal and Erythrosine is effective in the control of food-related bacteria in planktonic and biofilm states, Molecules 23, 2288, 2018.

Ghorbani et al., Pthosensitizers in antibacterial photodynamic therapy: an overview, Laser Therapy 27, 293-302, 2018.

George et al., Uptake pathways of anionic and cationic photosensitizers into bacteria, Photochemical & Photobiological Sciences 8, 788-795, 2009.

Kang et al., Experimental qualification of the process of electrostatic spray deposition, Coatings 9, 294, 2019.

Abrahamse et al., New photosensitizers for photodynamic therapy, Biochemical Journal 473, 347-364, 2016.

Wiehe et al., Trends and targets in antiviral phototherapy, Photochemical & Photobiological Sciences 18, 2565-2612, 2019.

Leem et al., Plasmonic photocatalyst-like fluorescent proteins for generating reactive oxygen species, Nano Convergence 5, 8, 2018.

Morawska et al., It is time to address airborne transmission of coronavirus disease 2019 (covid-19), Clinical Infectious Diseases 71, 2311-2313, 2020.

Ong et al., Air, surface environmental, and personal protective equipment contamination by severe acute respiratory syndrome coronavirus 2 (SARS-COV-2) from a symptomatic patient, JAMA—Journal of the American Medical Association 323, 1610-1612, 2020.

Dias et al., An update on clinical photodynamic therapy for fighting respiratory tract infections: A promising tool against COVID-19 and its co-infections, Laser Physics Letters 17, 2020.

Tsai et al., Faraday waves-based integrated ultrasonic micro-droplet generator and applications, Micromachines 8, 56. 2017.

Sia et al., Pathogenesis and transmission of SARS-COV-2 in golden hamsters, Nature 583, 834-838, 2020.

Svyatchenko et al., Antiviral photodynamic therapy: Inactivation and inhibition of SARS-COV-2 in vitro using methylene blue and radachlorin, Photodiagnosis and Photodynamic Therapy 33, 102112, 2021.

Dias et al.. The use of photodynamic therapy for the treatment of infections in the respiratory tract, Photodiagnosis and Photodynamic Therapy 31, 101804, 2020.

Bhapkar et al., Photodynamic therapy (PDT): An alternative approach for combating COVID-19, Biointerface Research in Applied Chemistry 11, 12808-12830, 2021.

* cited by examiner

FIG. 1

ANTIVIRAL AND ANTIBACTERIAL DISINFECTION AERO-SOLUTION USING EDIBLE FOOD DYES

CROSS-REFERENCE TO RELATED APPLICATIONS

The present patent application is related to and claims the priority benefit of U.S. Provisional Patent Application Ser. No. 63/021,569, filed 7 May 2020, entitled VOLUMINOUS AND AIRBORNE ANTIVIRAL AND ANTIBACTERIAL DISINFECTION OF PHOTODYNAMIC THERAPY USING EDIBLE FOOD DYES; and is further related to and claims the priority benefit of U.S. Provisional Patent Application Ser. No. 63/058,433, filed 29 Jul. 2020, entitled ANTIVIRAL AND ANTIBACTERIAL DISINFECTION AERO-SOLUTION USING EDIBLE FOOD DYES, the contents of each of which are hereby incorporated by reference in its entirety into the present disclosure.

STATEMENT REGARDING GOVERNMENT FUNDING

This present disclosure was not supported by government funding.

TECHNICAL FIELD

The present disclosure generally relates to airborne or whole room air disinfection, and in particular, to a system for disinfection and airborne pathogen inactivation utilizing edible food dyes aero-solutions.

BACKGROUND

This section introduces aspects that may help facilitate a better understanding of the disclosure. Accordingly, these statements are to be read in this light and are not to be understood as admissions about what is or is not prior art.

Transmission of pathogens (viruses and bacteria) often occurs in the air and infection with pathogens is transmitted by an airborne route. For example, 239 medical experts wrote a letter to world health organization (WHO) to inform that coughing or sneezing of a person infected with SARS-CoV-2 (virus that causes COVID-19) produces virus-containing droplets and aero-solutions (aerosols) and that aerosolized droplets floating in the air can cause infection. WHO has also recognized that aerosolized droplets can lead to COVID-19 infection. It is critical to disinfect and sanitize a large volume of indoor air where many people are present in a safe and effective manner. WHO has officially recognized that coughing or sneezing of an infected person with SARS-CoV-2 can produce virus-containing droplets and aerosols, and that those aerosolized droplets can lead to COVID-19 infection in indoor environments beyond the 6 feet range encouraged by social distancing recommendations. However, an effective and safe solution, particularly for indoor situations has not been forthcoming. For example, disinfectant sprays often result in health hazards. In addition, these sprays while effective for cleaning and disinfecting surface, do little to allow disinfection of large volumes of air, e.g., in an indoor sports area or a movie theater.

Several voluminous antiviral and antibacterial disinfection techniques are available, such as aerosolized hydrogen peroxide, hydrogen peroxide vapor, and deep ultraviolet (UV-C light) illumination. The most common method is to use hydrogen peroxide with a fogging machine, which is often used for pharmaceutical cleanrooms. However, those approaches are broadly considered as posing biohazards in humans (e.g. eyes, skin, inhalation, etc.). In addition, semiconductor photocatalysis nanoparticles (e.g. titanium dioxide; $TiO_2$) and noble metal nanoparticles (e.g. silver; Ag and copper; Cu) have been extensively developed for disinfection applications, but the potentially hazardous and adverse (e.g. carcinogenic and cytotoxic) effects associated with such semiconductor and metal nanoparticles have limited the widespread utilization.

In situations where airborne transmission of pathogens (viruses and bacteria) occurs in the air and infection with pathogens is transmitted by the airborne route, it is critical to develop a method that can disinfect a large volume of indoor air or whole room air cleaning. Large-volume sterilization methods can be applied indoor where many people are present to minimize airborne viral concentrations.

Large-volume sterilization is needed for a healthcare professional to change personal protective equipment (PPE) in a hospital setting. Whole-body antiviral disinfection is critical, as viruses are often transferred from PPE, such as gowns, gloves, respirators, and goggles, onto healthcare workers' skin and clothing, which then cause additional infections. Indeed, healthcare workers are often infected when removing PPE in hospital settings.

As a result, there is a lack of antiviral and antibacterial airborne disinfection methods that can be applied to the entire body of healthcare professionals and infected patients indoor in a safe and controlled manner. Indeed, healthcare workers are often infected when removing PPE in hospital settings. Thus, it is imperative to use safe and biocompatible materials for disinfection, without using harmful particles or substances.

In addition, in situations where access to clean water is limited to wash and clean health and hygiene-related products in resource-limiting settings, it is necessary to develop a novel arrangement that can provide self-disinfection, self-sanitization, and self-cleaning functionalities.

Therefore, there is an unmet need for a novel system that can provide large air volume disinfection, whole-body voluminous disinfection, and whole room air disinfection for indoor voluminous disinfection without the aforementioned shortcomings of the prior art.

SUMMARY

A whole-body voluminous antiviral and antibacterial disinfection system is disclosed. The system includes a sterilization chamber, including a nozzle disposed in the sterilization chamber, a tank disposed outside the sterilization chamber, the tank is adapted to hold a photosensitizer fluid, a light source within the sterilization chamber adapted to flood the sterilization chamber with light; and a nozzle adapted to release the photosensitizer fluid in a fog-like dispersion to thereby generate reactive oxygen species.

A whole-room photodynamic airborne disinfection cleaner is also disclosed. The cleaner includes a container having an outlet configured to hold a volume of a solution of dissolved photosensitizer in a solvent having an absorption band, an ultrasound transducer disposed in the container and configured to apply ultrasound energy to the solution to thereby generate an aerosol, wherein the droplets of the aerosol is between about 1 μm and 5 μm, and a light source having a wavelength matching the absorption band of the photosensitizer disposed in the container about the outlet and configured to activate the solution to thereby generate reactive oxygen species.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 1 is a schematic illustration of a whole-body antiviral and antibacterial phototherapy system which uses aerosols or vapor of reactive oxygen species (ROS) generating substances.

DETAILED DESCRIPTION

Figure 2:
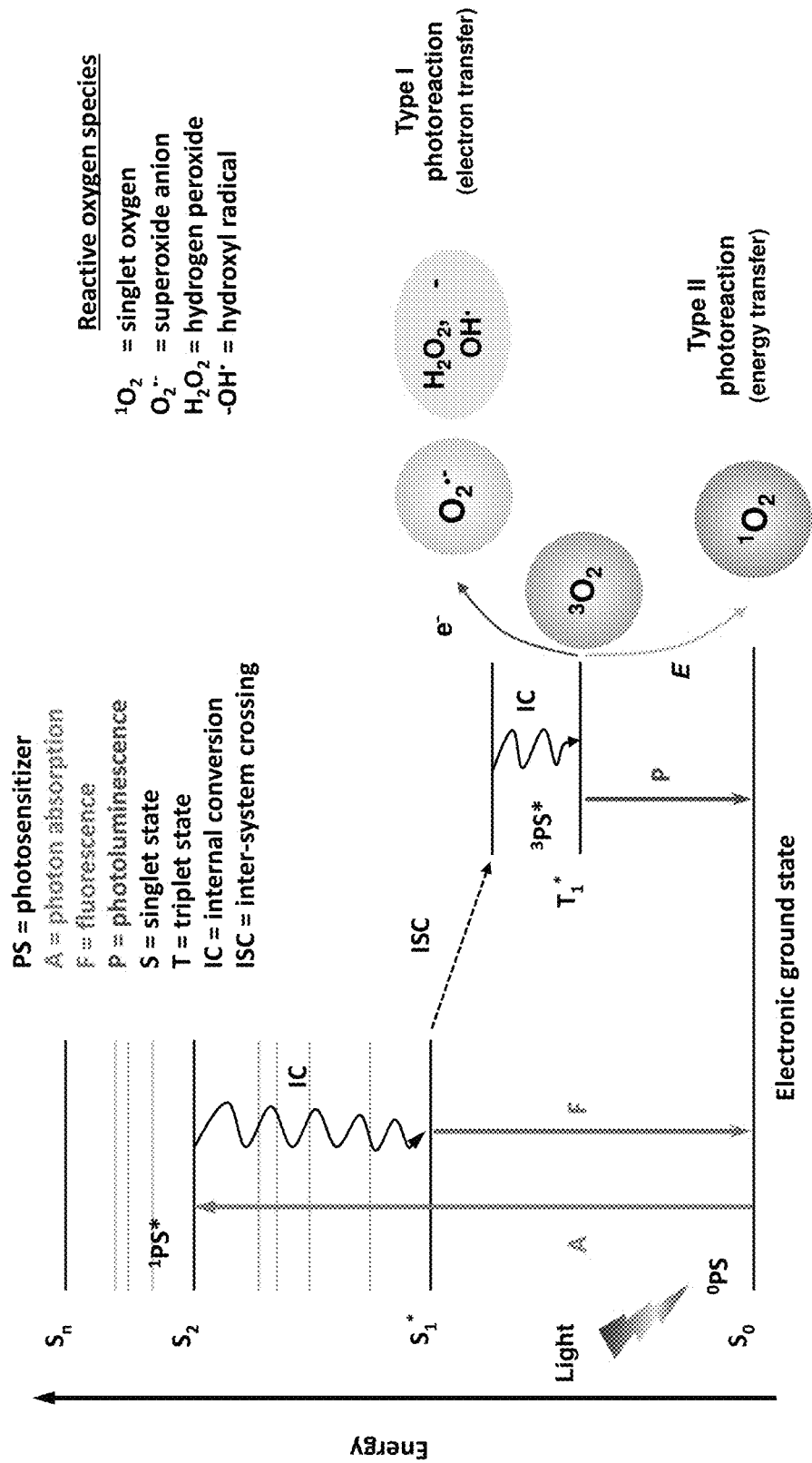
FIG. 2 is a Jablonski diagram of a photosensitizer for ROS generation by Type I and II photoreactions adapted to produce singlet oxygen via Type II photoreaction, in which energy transfer occurs from the excited triplet state of the fluorescent molecule to molecular oxygen.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel system and method is disclosed herein that can provide for whole-body voluminous disinfection of healthcare providers and patients and whole room air disinfection for indoor voluminous disinfection when many people are present in a confined space or when a healthcare professional is in a small confined chamber. In addition, the present disclosure also discloses self-disinfection, self-sanitization, and self-cleaning personal protection equipment (PPE), such as masks. In particular, the present disclosure describes a novel system that utilizes airborne antiviral and antibacterial phototherapy using aerosols or vapor of reactive oxygen species (ROS) generating substances. In addition, in situations where access to clean water is limited to wash and clean health and hygiene-related products in resource-limiting settings, a novel photoreactive arrangement is described that can provide self-disinfection, self-sanitization, and self-cleaning functionalities.

Additionally, another novel system and method is proposed herein that can provide large air volume disinfection, e.g., in a sports arena, a movie theater, an office space, or a home. Towards this end, an airborne antiviral phototherapy system using aerosols from FDA-approved food coloring dyes is disclosed. The concept of the present disclosure was inspired by photodynamic therapy (PDT), which is a treatment of certain cancerous and pre-cancerous lesions. PDT uses a photosensitizer that participates in Type II photosensitization reaction that produces singlet oxygen. Historically, PDT was first demonstrated against bacterial infection. Importantly, singlet oxygen is well-established to inactivate viruses by damaging viral functions (e.g. nucleic acids, proteins, and lipids). In particular, this is highly effective in inactivating enveloped viruses (e.g., SARS-CoV-2 is an enveloped virus). According to the present disclosure, PDT is used to disinfect airborne pathogens floating in the air; consequently the system of the present disclosure is referred to as a Photodynamic Airborne Cleaner (PAC). PAC is the first-of-a-kind of PDT aerosol generator for airborne disinfection.

Figure 1:
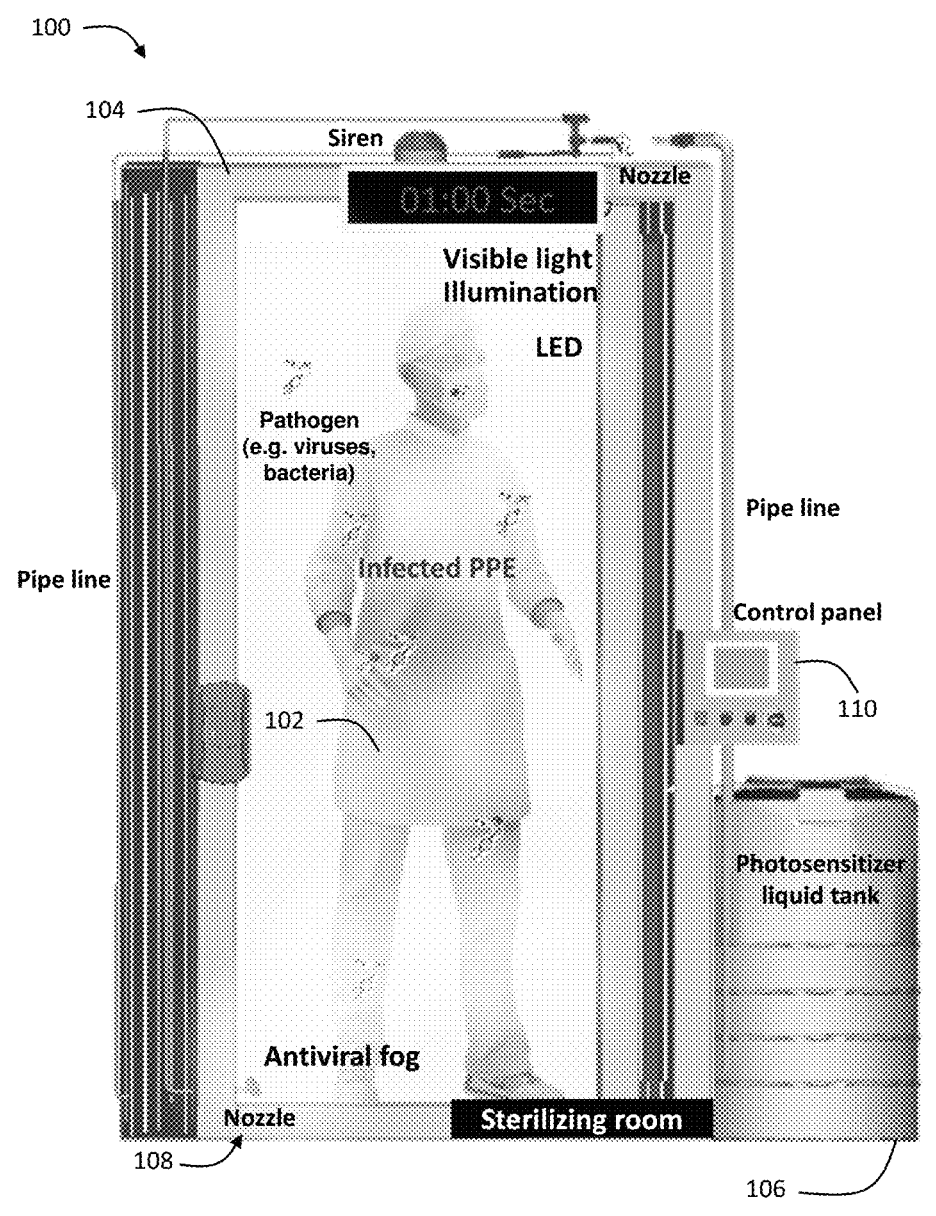

Referring to FIG. 1 a schematic illustration of a whole-body antiviral and antibacterial phototherapy system 100 is provided which uses aerosols or vapor of ROS generating substances. PPE 102 contaminated by pathogens is sterilized by a sterilization chamber 104 including liquid containing ROS-generating photosensitizers or tank 106, an electrostatic spray system 108 (e.g., a gun with a nozzle operating under high pressure, and other spray accessories), and a visible light source (e.g. LED). The sterilization chamber 104 (also referred to herein as a sterilizing room) includes a sufficiently large volume to accommodate a large swath of population. A nozzle is provided in a location of the chamber to avoid direct contact with a subject's eyes or face. For example, a nozzle can be positioned at the lower end of the chamber near a corner next to the subject's foot or to the subject's head. A control panel 110 coupled to the chamber 104 can be used to activate the chamber. This activation may be automatically initiated upon entry into the chamber through a door and closing the door. The photosensitizer tank 106 is adapted to hold a photosensitizer fluid, which according to one embodiment is either under pressure by a compressor (not shown) adapted to place the fluid therein at a sufficiently high pressure so that release through the nozzle results in generating a fog-like dispersion throughout the chamber in the form of aerosol or vapor. However, according to another embodiment, a spray is provided to release the fluid from the tank into the chamber in order to provide a fog-like dispersion.

The photosensitizer fluid is adapted to convert and release reactive oxygen species (ROS) when exposed to light. Therefore, the chamber also includes a light source for such conversion. According to one embodiment, ROS includes singlet oxygen; $^1O_2$ (i.e. $O_2(^1\Delta_g)$). The combination of nontoxic photosensitizers (e.g. selected edible dyes) with harmless visible light to produce ROS can selectively kill bacterial cells or viral pathogens. In general, photosensitizers (PS) participate in Type I and Type II photoreactions shown in FIG. 2, which is a Jablonski diagram of a photosensitizer for ROS generation by Type I and II photoreactions. Photosensitizers produce singlet oxygen via Type II photoreaction, in which energy transfer occurs from the excited triplet state of the fluorescent molecule to molecular oxygen. Some photosensitizers undergo Type I photoreaction, in which electron transfer to molecular oxygen yields superoxide and other oxygen radicals (e.g. hydrogen peroxide and hydroxyl radical).

In a similar manner, indoor air in a confined space is sterilized with standalone fog-like dispersion systems of photosensitizer fluid even when people are present.

According to one embodiment of the present disclosure, instead of using clinically used PDT photosensitizers, a cost-effective and safe edible class of photosensitizers is used that can be activated in visible light. In particular, several FDA-approved food coloring dyes have strong fluorescent properties and some of them generate singlet oxygen. These are shown in Table 1.

TABLE 1

Singlet oxygen ($^1O_2$)-generating safe and edible photosensitizers

| Representative photosensitizer | $^1O_2$ generation quantum yield | Maximum excitation wavelength (nm) | Charge |
|---|---|---|---|
| ZnTPP | 0.84-0.88 | 422, 520 | Cationic |
| TMPyP | 0.74 | 423, 520 | Cationic |
| TPPS4 | 0.62 | 413, 520 | Cationic |
| FD&C RED No. 105 (Rose Bengal) | 0.75 | 550 | Anionic |
| FD&C RED No. 3 (Erythrosine) | 0.63 | 530 | Anionic |
| FD&C RED No. 104 (Phloxine B) | 0.56 | 540 | Anionic |
| FD&C BLUE No. 2 (Indigo Carmine) | 0.3 | 607 | Anionic |
| Eosin B | 0.52 | 518 | Anionic |
| Eosin Y | 0.52, 0.57 | 518 | Anionic |
| Methylene blue | 0.52, 0.60 | 632 | Cationic |
| Fluorescein | 0.06 | 494 | Anionic |

Figure 3C:
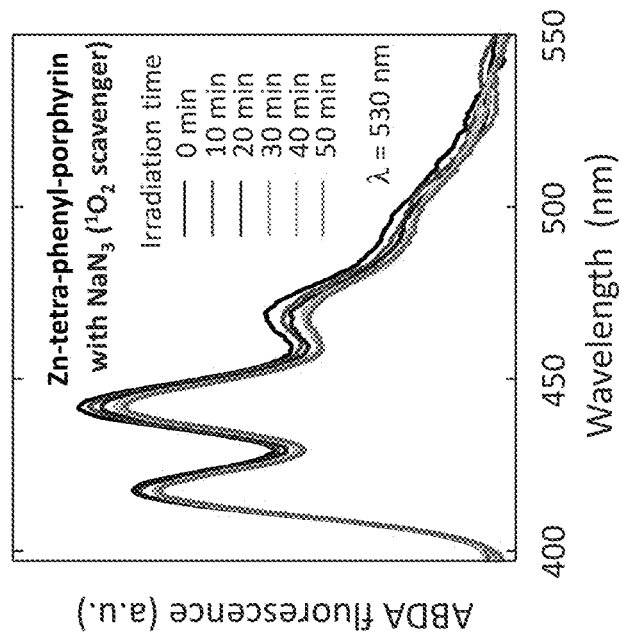
FIG. 3c is a graph of ABDA fluorescence vs. wavelength (nm) for detection of singlet oxygen (1O2) photogenerated by sodium azide ($NaN_3$) scavenger under green light activation of $\lambda=530$ nm.
Figure 3B:
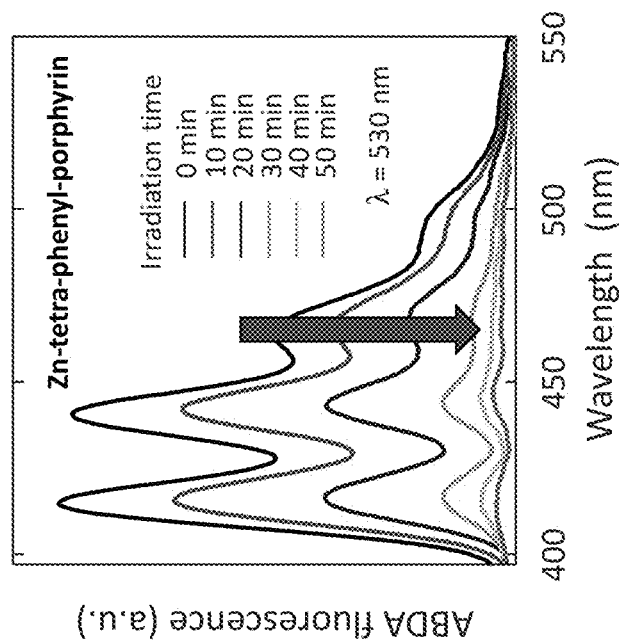
FIG. 3b is a graph of ABDA fluorescence vs. wavelength (nm) for detection of singlet oxygen ($^1O_2$) photogenerated by ZnTPP using the turn-off fluorescence ABDA radical probe shown.
Figure 3A:
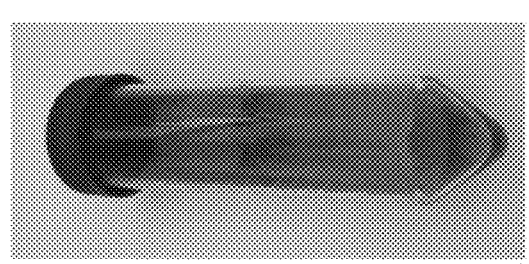
FIG. 3a is a photograph of a photosensitizer (e.g. Zn-tetra-phenyl-porphyrin (ZnTPP)) dissolved in a solution in a vial.
Figure 3F:
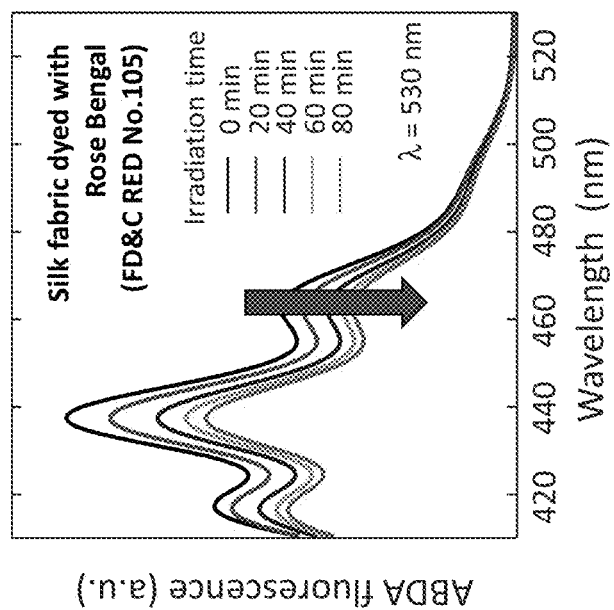
FIGS. 3e and 3f are similar graphs as those provided above in FIGS. 3b and 3c where singlet oxygen mediated by Type II photosensitization reaction is detected by reduction of the original ABDA fluorescence.
Figure 3E:
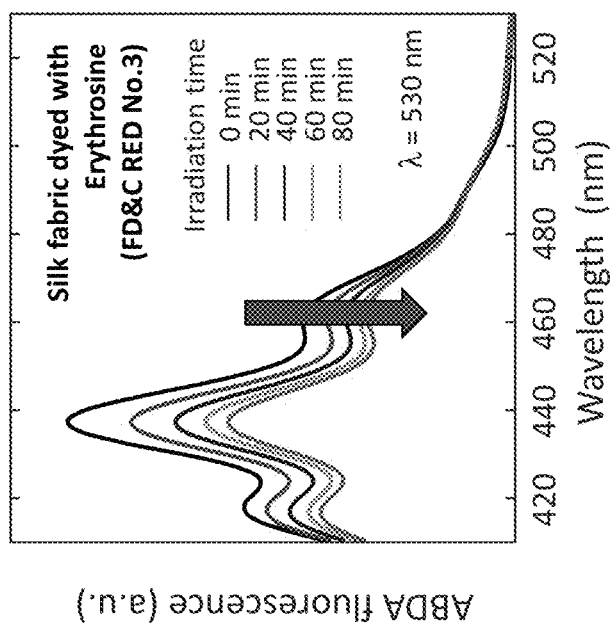
Figure 3D:
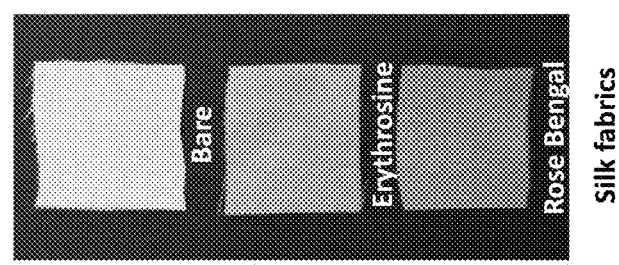
FIG. 3d is a photograph of fabrics with Erythrosine and Rose Bengal (i.e. photosensitizers) dyed silk fabrics.

ZnTPP: 5,10,15,20-Tetraphenyl-21H,23H-porphine zinc
TMPyP: 5,10,15,20-Tetrakis(1-methyl-4-pyridinio)porphyrin tetra(p toluenesulfonate)
TPPS4: 5,10,15,20-Tetrakis(4-hydroxyphenyl)-21H,23H-porphine In addition, some photosensitizers are soluble in water, which allows being easy to handle for spraying. For example, singlet oxygen photogenerated by photosensitizers (i.e., 5,10,15,20-Tetraphenyl-21H,23H-porphine zinc; ZnTPP, Erythrosine, and Rose Bengal) was verified using turn-off fluorescent radical probes (e.g. 9,10-anthracenediyl-bis(methylene)dimalonic acid; ABDA) and radical physical scavengers (e.g. sodium azide; $NaN_3$) under visible (green) light illumination of 530 nm (low optical intensity of 0.02 mW mm$^{-2}$). Erythrosine (50 µM) and Rose Bengal (50 µM) are dissolved in deionized water. Silk fabrics are immersed in Erythrosine and Rose Bengal solutions for 1 hour, respectively, and then, the dyed silk fabrics are dried in an ambient dark condition. The original state of ABDA emits fluorescence under light excitation ($\lambda_{ex} \approx 380$ nm and $\lambda_{em} \approx 431$ nm)[3] 3 3. After ABDA reacting with singlet oxygen, it is converted to an endoperoxide form that leads to a decrease in the fluorescent intensity. ABDA was initially dissolved in dimethyl sulfoxide and then is diluted in a buffer, resulting in a 20 µM ABDA solution. The photosensitizer was mixed with the ABDA solution and then the excitation light will be irradiated with stirring. The turn-off fluorescent signals of ABDA were monitored using a spectrophotometer system shown in FIGS. 3a-3c, which are a photograph of a photosensitizer (i.e. ZnTPP) dissolved in a solution (FIG. 3a), and graphs of ABDA fluorescence vs. wavelength (nm) for detection of singlet oxygen ($^1O_2$) photogenerated by ZnTPP using the turn-off fluorescence ABDA radical probe shown in FIG. 3b and sodium azide ($NaN_3$) scavenger shown in FIG. 3c under green light activation of $\lambda=530$ nm. In addition, Erythrosine and Rose Bengal (i.e. photosensitizers) are dyed in silk fabrics (FIG. 3d which is a photograph of such fabrics). Singlet oxygen in silk fabrics dyed with Erythrosine and Rose Bengal is also detected with the ABDA probe (FIGS. 3e and 3f which are similar graphs as those provided above in FIGS. 3b and 3c). Singlet oxygen mediated by Type II photosensitization reaction is detected by reduction of the original ABDA fluorescence. In FIGS. 3b, 3e, and 3f, the intensity of ABDA fluorescent peaks gradually drops as the irradiation time increases, supporting the generation of singlet oxygen by ZnTPP, Erythrosine, and Rose Bengal. On the contrary, there is no significant difference in the intensity of ABDA in the presence of singlet oxygen scavenger (i.e. $NaN_3$), as shown in FIG. 3c.

Figure 4:
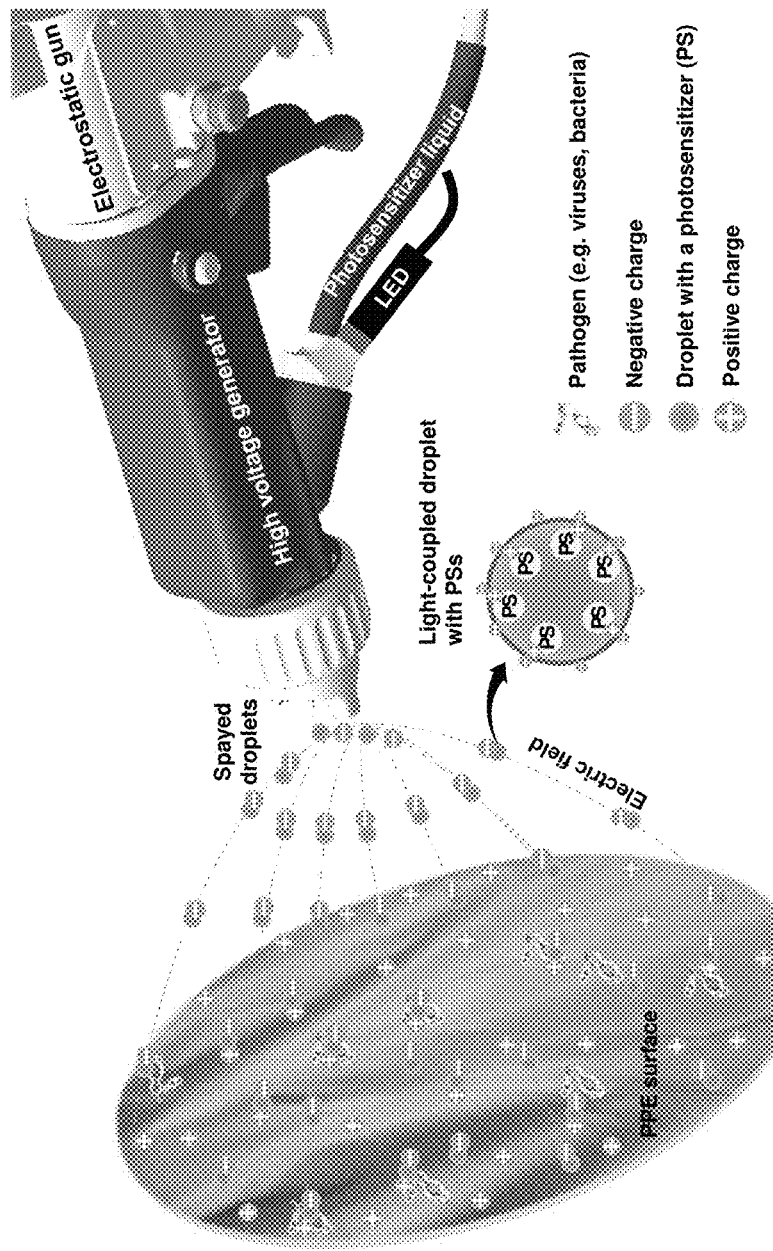
FIG. 4 is a schematic of an electrostatic discharge device that can be used as the nozzle of the whole-body antiviral and antibacterial phototherapy system of FIG. 1.
Figure 5:
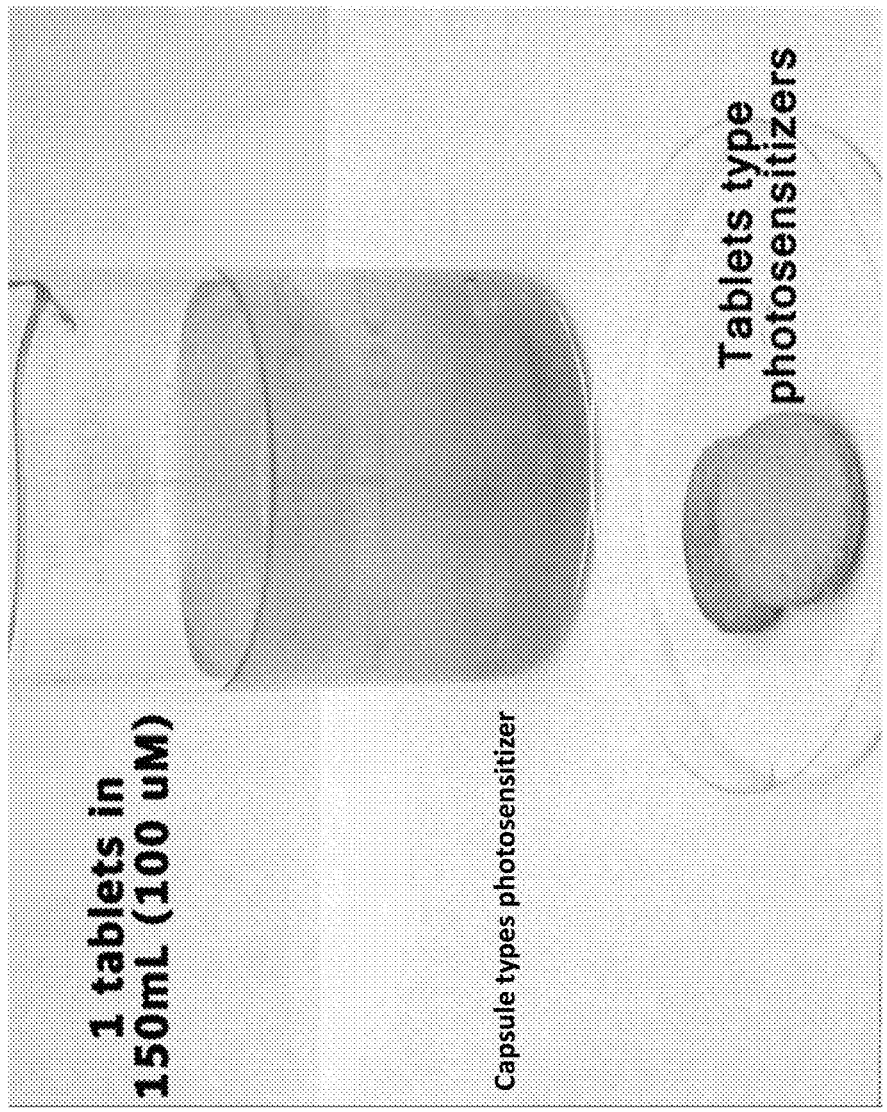
FIG. 5 is a photograph of a photosensitizer tablet (two tablets shown in the figure), e.g., tablet version of RED #105 food coloring with a concentration of 100 µM is shown which in 150 mL solution can be dissolved quickly.
Figure 6B:
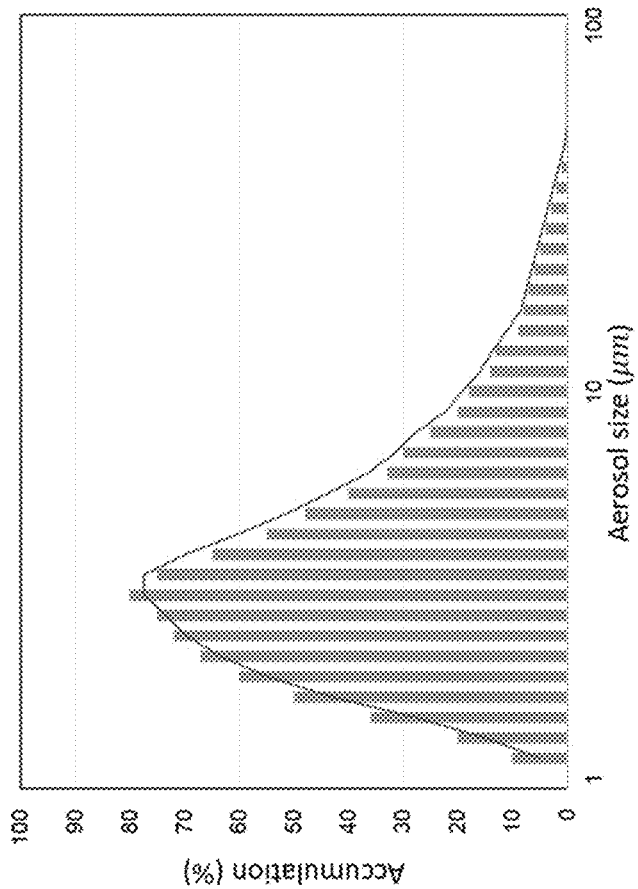
FIG. 6b is a graph of accumulation in % vs. aerosol size in µm of the aerosolized particles by the ultrasonic transducer.
Figure 6A:
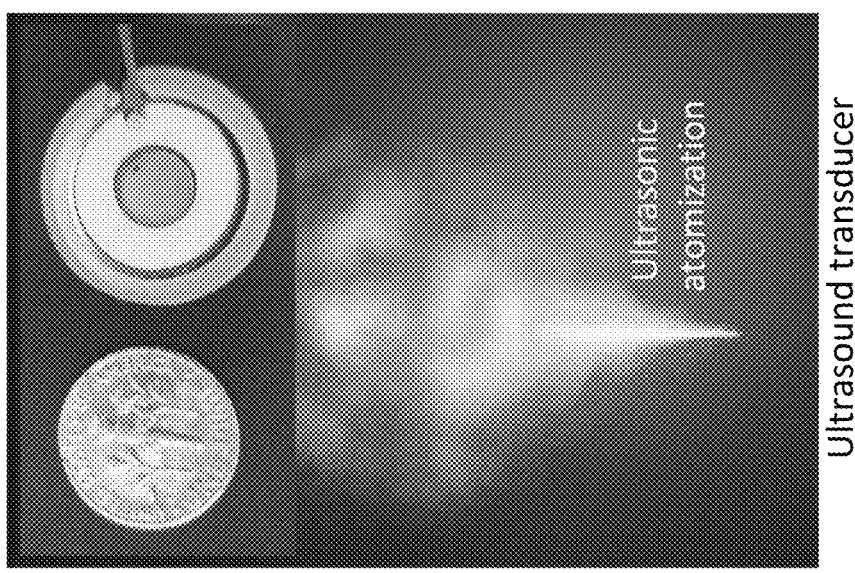
FIG. 6a is a photograph of an ultrasound transducer according to the present disclosure shown in relationship to size of US Dime.
Figure 7A:
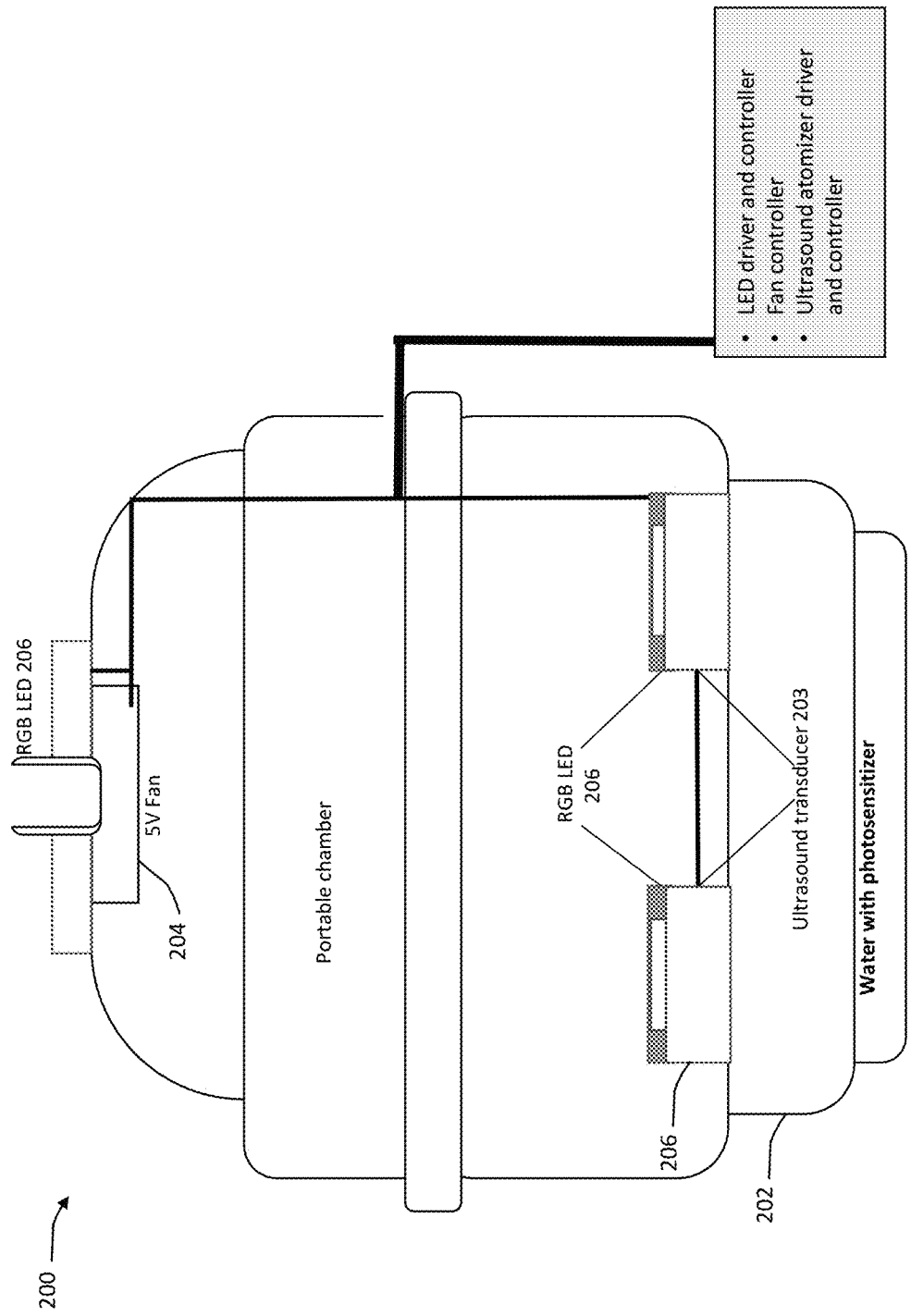
FIG. 7a is a schematic of a Photodynamic Airborne Cleaner (PAC) according to the present disclosure which can be used in rooms, or as a personal, e.g., desktop, disinfectant.
Figure 7B:
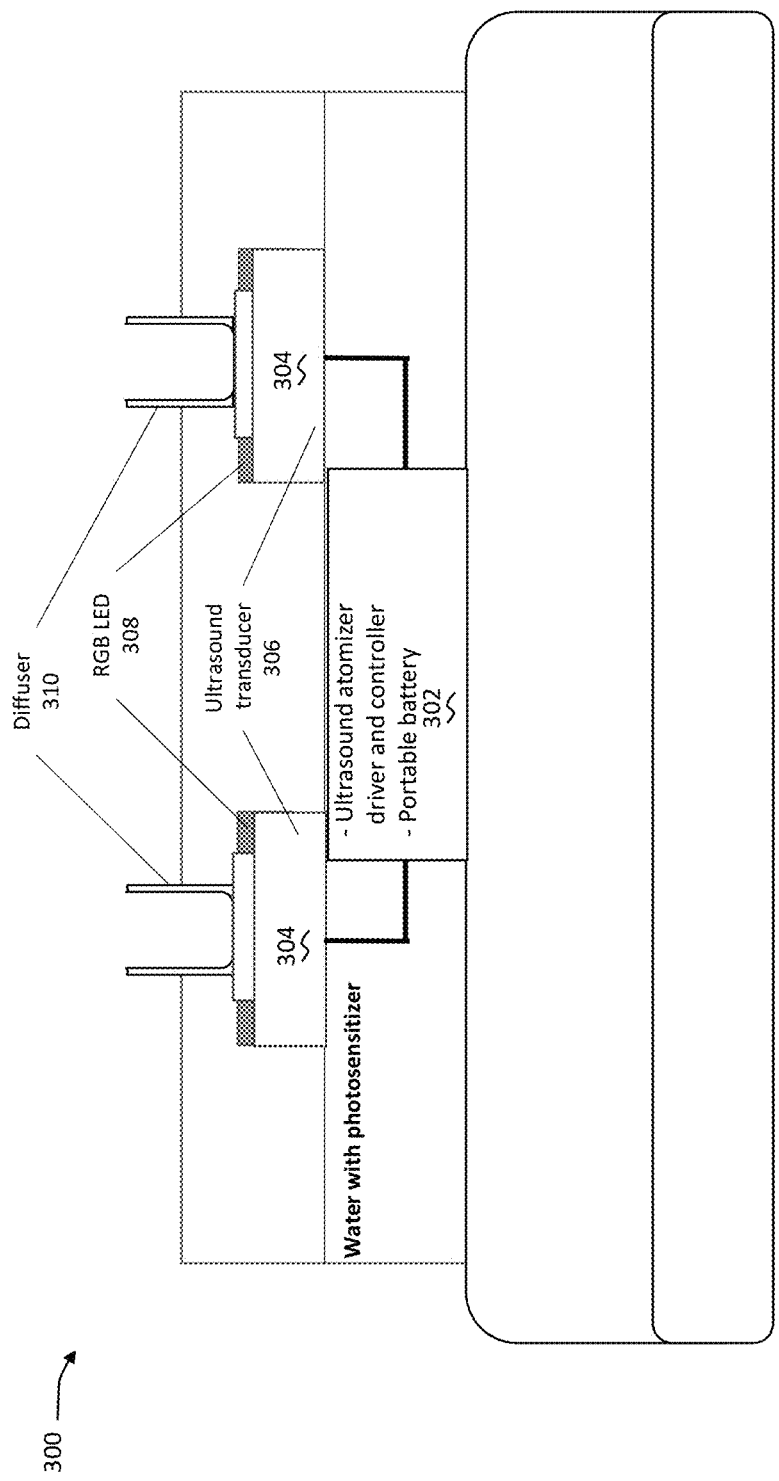
FIG. 7b is a schematic of another a robot-like system adapted to move about a large area, e.g., a whole house or an office space.
Figures 8A, 8B:
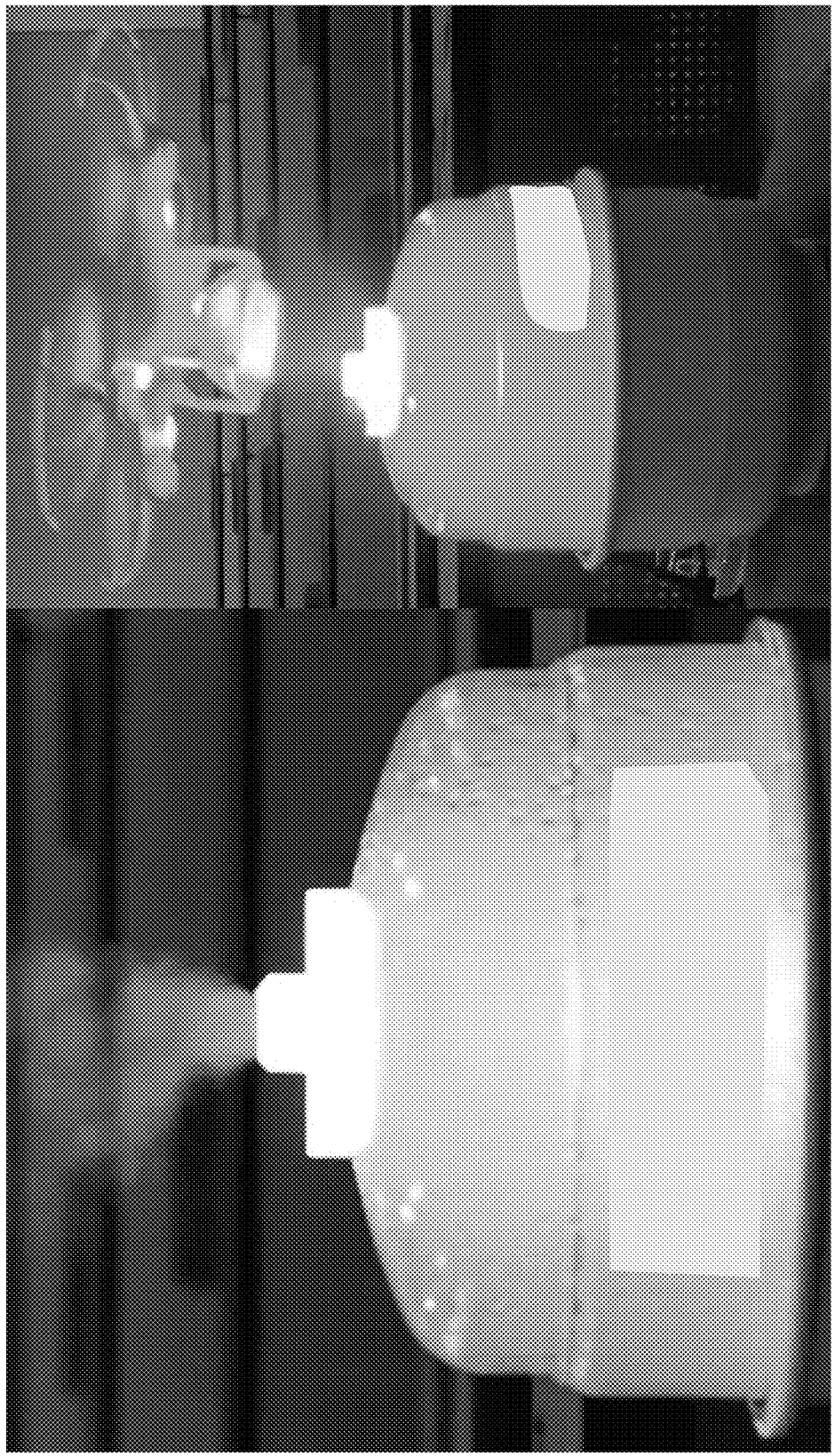
FIG. 8a is a photograph of a table-top diffuser with an ultrasound transducer therein, according to the present disclosure.
FIG. 8b, is a photograph of an unmanned aerial vehicle (UAV) that can be configured to provide the aerosol from above as the UAV is flying from one point to another from a container which holds the fluid to be dispensed.
Figure 8C:
FIG. 8c is a photograph of an array of diffusers each with a reservoir of fluid to be aerosolized and each with individual controls adapted to selectively aerosolize.
Figure 9B:
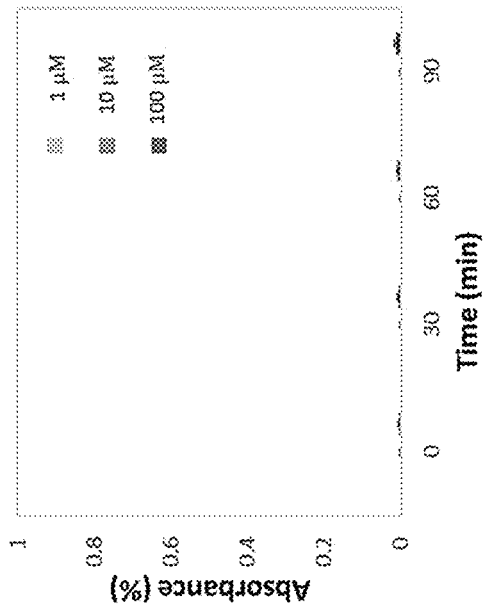
FIG. 9b is graph of absorbance vs. time in minutes depicting absorption of food dyes on the surface of the chamber of FIG. 9a is negligible.
Figure 9A:
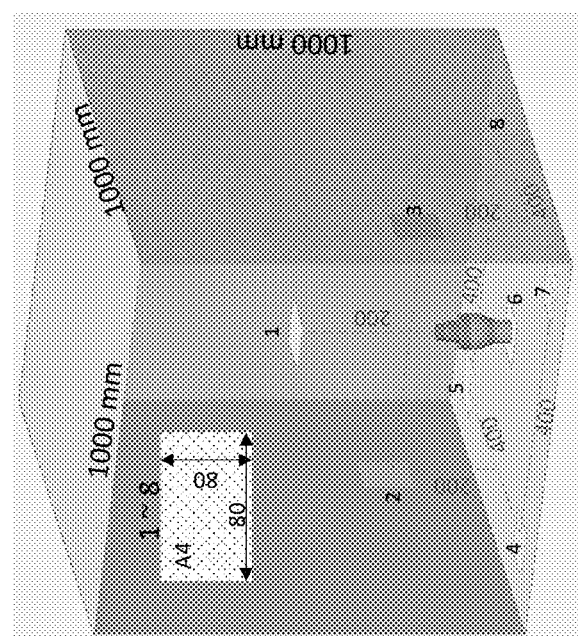
FIG. 9a is a schematic of a large sealed chamber sealed to block the inflow of external air with test papers disposed at various locations to determine how much aerosols deposit on the paper from the aerosol generator is achieved by monitoring color staining on the paper.

To achieve whole-body voluminous disinfection, aerosols or vapor are generated with electrostatics, which improves the attachment aerosols or vapor to the target surface. Referring to FIG. 4, a schematic of an electrostatic discharge device is shown that can be used as the nozzle of the present disclosure. The electrostatic spraying method is widely used for coating due to its advantages of high productivity, reduction of coating overspray, and minimizing solvent usage. The basic theory of electrostatic spraying is to apply a negative charge to the fluid containing photosensitizers (PS) being applied and to ground or apply positive charge to the target surface being coated. Using the basic principle that opposite charges attract, the fluid would then be attracted to the surface, allowing for a full, even coat of fluid on the surface. With the process of atomization, each droplet becomes charged with the same negative charge. Again using the basic principle that opposite charges attract and similar charges repel, the droplets are naturally repelled by one another, and freely break apart or atomize. This is the primary concept that allows for a more even coating. For this principle, sprayed droplets can get to hard-to-reach areas, such as crevices, around corners, and backsides of surfaces. The photosensitizer droplets will "seek out" uncoated surfaces to adhere to rather than already coated areas, as the attraction is stronger to the uncoated surfaces. Conventional sprayers use a mechanical atomization method, where air pressure is used to break down the particles. This type of spraying leads to a higher forward spraying velocity, and in turn, there can be splatter or overspray. This issue does not happen with electrostatic spraying since air pressure is not used in the atomization process. In addition, the charged droplets do not coalesce with each other due to the same charge. This effect further facilitates the photosensitizers to be uniformly coated on the surface. In the electrostatic spraying deposition, the size and speed of droplets sprayed from a nozzle can be controlled by adjusting the induced voltage. In particular, the dry fog (i.e. ultra-fine droplets with a microscale range of 1-10 μm) does not wet the PPE due to the quicker evaporation. Such small size is also effective in the reactions between photosensitizers and pathogens because of the increased surface area of droplets.

To achieve indoor air disinfection, aerosols or vapor are generated without electrostatics to be floated in the air. In this case, the size of photosensitizer aerosols determines the traveling behavior in the air. Importantly, aerosol particles (<5 μm) can remain airborne indefinitely under most indoor conditions unless there is propelling flow. An effective way to generate such small aerosols is to use an ultrasonic aerosol generator; if the ultrasonic drive frequency is greater than 0.8 MHz, the aerosol size is less than 5 μm. This can be done as discussed above with an aerosol spray from a compressed fluid tank or pressurized by a pump. Same photosynthesized ROS fluid can be provided under these conditions to achieve desired results.

For effective activation light coupling with aerosols, droplets, or vapor, the activation light source (e.g. LED) is integrated with a photosensitizer solution near the nozzle (see FIG. 4). In other words, aerosols, droplets, or vapor coupled with the activation light are distributed in a large area. In this case, the activation light is trapped inside aerosols, droplets, or vapor due to the whispering-gallery modes, resulting in effective generation of singlet oxygen. In addition, the electric field in aerosols, droplets, or vapor helps the photosensitizer molecules to concentrate on the surface of individual aerosols, droplets, or vapor at the boundary with air. Overall, the light coupling and electrostatic approach is advantageous over the light illumination from outside in which strong light scattering or light diffusion in this turbid medium can prevent the activation light from reaching to aerosols, droplets, or vapor in the center.

ROS, in particular singlet oxygen, can be used to inactivate harmful microorganisms including bacteria, yeasts, fungi, viruses, and spores by damaging one or more their functions (e.g. nucleic acids, proteins, and lipids). Singlet oxygen is capable of reacting with a variety of biologically important substrates and it initiates further oxidative reactions. It is well established that exogenous singlet oxygen causes direct damage to bacteria and viruses, leading to potential cytotoxicity and mutagenicity. SARS-CoV-2 which causes COVID-19 and other enveloped viruses can also be inactivated efficiently by singlet oxygen because those viruses have lipids and proteins to build their outer layer. Singlet oxygen photogenerated by photosensitizers via a spray system effectively inactivates bacteria and viruses on the surface (i.e. physical contact) of PPE. Importantly, singlet oxygen is highly effective for inactivating enveloped viruses (SARS-CoV-2 is an enveloped virus). It has also been proposed to use PDT against respiratory tract infections associated with SARS-CoV-2 and its co-infections.

In addition to the disinfection including whole-body voluminous disinfection and airborne pathogen inactivation within a room or a building with individuals present, the present disclosure also discloses self-disinfection, self-sanitization, and self-cleaning PPE, such as masks. In so far as PPEs, the present disclosure is applicable to self-disinfection, self-sanitization, and self-cleaning PPE for menstrual health and hygiene products in a setting where access to clean water is limited is self-disinfection, and self-sanitizing, and self-cleaning for clean water-free laundry and biological stain removal.

To this end, fabrics dyed with regulatory agency (e.g., FDA)-approved food coloring additives can generate reactive oxygen species, in particular singlet oxygen, upon weak visible light illumination (e.g. ambient room light). Several FDA-approved food coloring dyes have strong fluorescent properties and some of them generate singlet oxygen, which is similar to oxygen bleach in some laundry detergents. For example, as a very inexpensive edible food coloring dye, FD&C RED No. 3 (Erythrosine) was used, showing a high singlet oxygen generation efficiency of 63%. In this case, it would not be necessary to use an outdoor drying rack requiring access to strong sunlight, which can offer additional flexibility of simple use indoors.

Figure 10A:
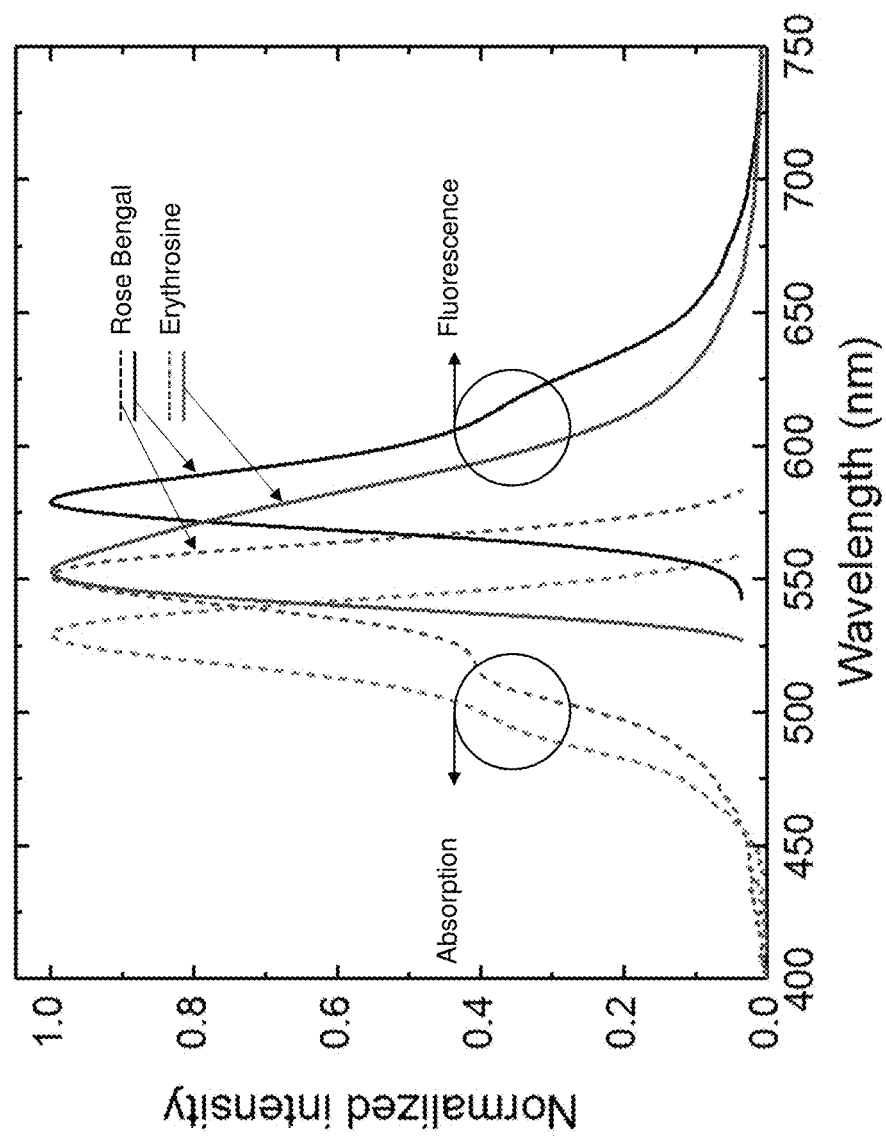
FIG. 10a is a graph of normalized intensity vs wavelength showing absorption and fluorescence for Rose Bengal and Erythrosine.
Figure 10B:
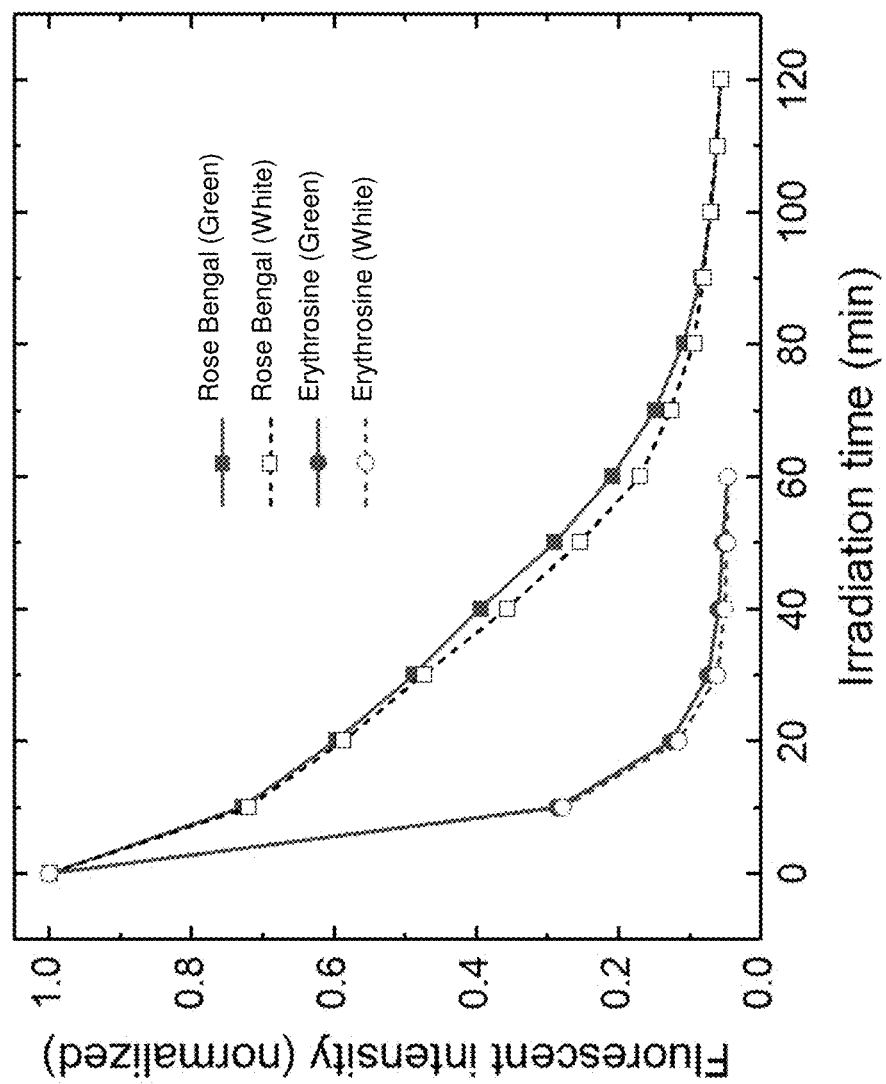
FIG. 10b is a graph of the normalized fluorescent intensity of Rose Bengal and Erythrosine with a 5 µM concentration at the maximum emission wavelength of 552 nm (Erythrosine) and 569 nm (Rose Bengal) under illuminations of green (laser, $\lambda_{ex}=532$ nm, 6.3 mW cm$^{-2}$) and white (LED, 2400 lux, 6.5 mW cm$^{-2}$ at $\lambda_{ex}=532$ nm) lights, respectively.
Figure 10C:
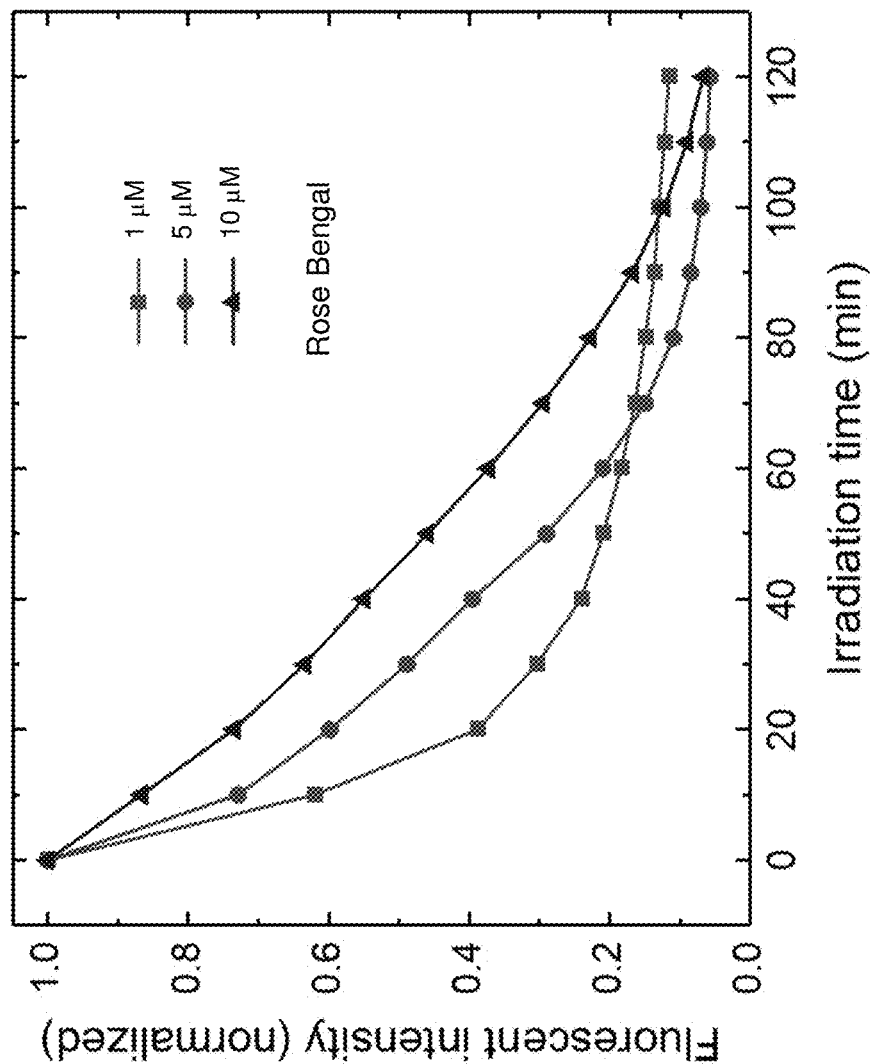
FIG. 10c is a graph of fluorescent intensity (normalized) vs. irradiation time in minutes for Rosa Bengal at 1 µM, 5 µM, and 10 µM.

The system of the present disclosure has several advantages: 1) Visible (or green light) illumination is used, thus no ultraviolet (UV) irradiation is needed. In particular, UV irradiation is broadly considered as a serious biohazard. 2) Short damage distance: The typical migration distance of singlet oxygen is less than about 200 nm in air, which can serve as a safeguard; disinfection and sanitization occur only when singlet oxygen has a physical contact with pathogens. 3) No need for additional nanomaterials: Semiconductor photocatalysis nanoparticles (e.g. $TiO_2$) and noble metal nanoparticles (e.g. silver or copper) have been extensively developed for self-cleaning and disinfecting applications, but the potentially hazardous effect of nanoparticles has limited the widespread utilization. 4) Regulatory agency (e.g., FDA)-approved food coloring dyes are edible and safe for human use. 5) Excellent dyeability: because such dyes (e.g. RED 3) are an acid water-soluble dye, the acid dye anions are easily adsorbed in a variety types of natural (e.g. cotton, silk, and wool) and synthetic fabrics (e.g. nylon, polyester, acrylic, spandex, and olefin), forming a strong electrostatic bond or a salt linkage. 6) Reusability: Photoreactive fabrics are easily hand-washable and can last a lifetime (semi-permanent) with proper care. It can be re-dyed with RED 3, which is quite inexpensive, safe, and easy to handle. These food coloring dyes are cost-effective for mass-use. 6) The coloration of edible dyes on PPE can be used to indicate how many times PPE is exposed to the photodynamic therapy to alert the user when to replace and dispose. 7) Generation of aerosols or vapor with ultrasonic transducers reduces overspray and minimizes solvent usage with extended flowing time in the air. These advantages make for beneficial PPE sterilization in hospitals, nursing homes, and outpatient clinics. In addition, these advantages make for beneficial voluminous sterilization of air in a confined space when many people are present.

Referring to FIG. 5, a photosensitizer tablet (two tablets shown in the figure), e.g., tablet version of RED #105 food coloring with a concentration of 100 μM is shown in 150 mL solution can be dissolved quickly.

PDT tablets can be fabricated using various methods. For example, tablet and capsule type photosensitizers are possible. Dilution time with fabricated tablet (a) and capsule type photosensitizers diluted in water is shown in FIG. 5. To facilitate quick dissolution, the tablets may be effervescent-type. Effervescent tablets, including PDT, are well broken in contact with water, which easily makes a PDT solution. The effervescent tablets are made of ingredients, such as citric acid, sodium bicarbonate, and starch. Another type is a PDT powder-containing capsule fabricated with water-soluble polymers, including gelatin, carboxymethyl cellulose, starch, acrylic acid, maleic anhydride, methacrylic acid, and other water-soluble compounds known to a person having ordinary skill in the art.

FIG. 6*a* is a photograph of an ultrasound transducer according to the present disclosure shown in relationship to size of US Dime.

FIG. 6*b* is a graph of accumulation in % vs. aerosol size in μm of the aerosolized particles by the ultrasonic transducer. The ultrasound transducer with a frequency of about 0.8 MHz or higher generates uniform micron-sized droplets between about 1 μm and about 5 μm. The size of photosensitizer aerosols determines the traveling behavior in the air. Aerosol particles (<5 μm) can remain airborne indefinitely under most indoor conditions unless there is propelling flow. If aerosol particles have a size smaller than 1 μm, those small aerosol particles they can be inhaled deep into the lung. The magic size of aerosols, which is 5 μm on average, to enhance the diffusion and to minimize potential inhalation.

Referring to FIG. 7*a*, an embodiment of the PAC 200 of the present disclosure is shown. The PAC 200 in FIG. 7*a* is a diffuser that utilizes an ultrasound transducer to selectively atomize the dissolved solution of a solvent (e.g., water) and a photosensitizer, e.g., food coloring RED #105. The system 200 shown in FIG. 7*a* includes a chamber 202 that holds the photosensitizer solution in which it houses the ultrasound transducer 203 controlled by a controller. The frequency of operation of the ultrasound transducer controlled by the controller can determine the size of the aerosol. A fan 204 disposed at the outlet of the chamber further distributes the aerosol. Additionally, light emitting diodes (LEDs) 206 are provided at the outlet as well as within the chamber in proximity to the ultrasound transducer. The LEDs are controlled by a controller (not shown). The dissolved photosensitizer is activated by the LEDs at the transducer position, the outlet, or both.

The PAC (diffuser system) 200 shown in FIG. 7*a* can be used in rooms, or as a personal, e.g., desktop, disinfectant. This configuration (FIG. 7*a*) is contrasted with a moveable PAC 300, shown in FIG. 7*b* in which a robot-like system is used to move the system 300 around a larger area, e.g., a whole house or an office space. The robot-like system 300 includes mobility (not shown) via wheels, an ultrasound atomizer driver and controller 302, a battery, with one or more containers 304 each containing an ultrasound transducer 306, each containing an LED 308, and a diffuser 310. According to yet another embodiment, the PAC according to the present disclosure shown in FIG. 8*a* can be provided as a single diffuser with an ultrasound transducer therein, or as shown in FIG. 8*b*, as attached to an unmanned aerial vehicle (UAV) that can be configured to provide the aerosol from above as the UAV is flying from one point to another from a container. The configuration shown in FIG. 8*a* is suitable for a small area, such as a room, etc. The configuration shown in FIG. 8*b* is suitable for a sports arena or a large building. Additional embodiments may include portable handheld PAC (not shown). Another configuration of the PAC is shown in FIG. 8*c* which includes a container, a diffuser with an ultrasound transducer therein, and a control panel on the backside to adjust settings of the diffuser.

The ultrasound transducer with a frequency of about 0.8 MHz or higher generates uniform micron-sized droplets between about 1 μm and about 5 μm. As discussed, the 5V Fan adjacent to the opening propels the air outside the chamber and the outer RGB LED activates singlet oxygen.

The size of aerosols determines the traveling behavior. The aerosol size of PAC is important in twofold. First, particles that are 5 μm or smaller in size remain airborne indefinitely under most indoor conditions unless there is propelling flow such as air current or ventilation. To make PAC aerosols float in the air, it is necessary to generate PAC aerosols smaller than 5 μm. The approach provided herein to generate aerosols in different sizes is to use ultrasonic transducers (ultrasonic micro-droplet generator). If the ultrasonic drive frequency is greater than 0.8 MHz, the aerosol size is less than 5 μm. Second, the food coloring dyes have red colors. It is advantageous to ensure that these dyes do not stain surfaces. Importantly, such small aerosols do not fall on surfaces as they float, evaporate, and photodegrade.

To examine the efficacy of the system of the present disclosure, a large chamber sealed with plastic to block the inflow of external air was built. The setup is shown in FIG. 9*a*. The chamber was placed in dark to avoid photobleaching of food dyes. Rectangular white filter papers were positioned at eight different locations (numbers 1-8 in FIG. 9*a*) in the chamber to test how much aerosols deposit on the paper from the aerosol generator (i.e. color staining). Three different concentrations of food dyes (1 μM, 10 μM, and 100 μM) were used. The adsorption of food dyes on the papers was evaluated with a spectrometer after 30, 60, 90, and 120 minutes. The very low light absorption of food dyes indicates that their adsorption on the surface of the chamber is negligible as provided in FIG. 9*b*.

Photosensitizers can be activated with the light sources in the system or ambient room light. Typical light levels (300 lux of white light) would be sufficient to generate singlet oxygen. Visible light (e.g. room light or sunlight) serves as an activation light source to completely avoid UV irradiation.

To test the lifetime of photosensitizers, we monitored the fluorescent emission of Rose Bengal and Erythrosine, respectively. FIG. 10*a* is a graph of normalized intensity vs wavelength showing absorption and fluorescence for Rose Bengal and Erythrosine. 0.5-mL aqueous solutions of each photosensitizer were put into a cuvette and then the fluorescent spectrum was measured using a fiber bundle-coupled spectrometer (VS140 VIS-NIR; Horiba Jobin Yvon Inc., Edison, NJ, USA). FIG. 10b shows the normalized fluorescent intensity of Rose Bengal and Erythrosine with a 5 μM concentration at the maximum emission wavelength of 552 nm (Erythrosine) and 569 nm (Rose Bengal) under illuminations of green (laser, $\lambda_{ex}$=532 nm, 6.3 mW cm$^{-2}$) and white (LED, 2400 lux, 6.5 mW cm$^{-2}$ at $\lambda_{ex}$=532 nm) lights, respectively. Lifetime of Rose Bengal is longer than that of Erythrosine, showing complete photobleaching after 120 min (60 min for Erythrosine). Both are also activated by a white LED with 2400 lux. Considering that the standard illumination level of normal workstation spaces is 500 lux, the lasting time of singlet oxygen generation for Rose Bengal and Erythrosine can be estimated to be about 9.6 and 4.8 hours, respectively. The lasting time of photosensitizers is dependent on the concentration (as shown in FIGS. 10b and 10c).

As shown in Table 1, several disinfection techniques are available (e.g. aerosolized hydrogen peroxide, hydrogen peroxide vapor, ozone, steam, and deep UV illumination). However, these are broadly considered as posing biohazards in humans. In addition, they are more appropriate to disinfect surfaces rather than airborne pathogens floating in the air.

TABLE 1

Advantages and disadvantages of similar disinfection methods

| Method | Disinfection target | Safety (human presence) | Lasting time | Light source | Portability | Efficacy |
|---|---|---|---|---|---|---|
| Photodynamic airborne cleaner (PAC) | Airborne | Yes | Controllable | Green light, white light, sunlight | Yes | Yes |
| UV light | Airborne surface | No | Controllable | UV-C (100-280 nm) | Yes | Yes |
| High-intensity narrow-spectrum light | Airborne Surface | Yes | Controllable | Blue light (405 nm) | Yes | No |
| Aerosolized hydrogen peroxide (ethanol, ozone, chlorine dioxide, etc.) | Surface | No | Short | None | Yes | Yes |
| Vaporous hydrogen peroxide (ethanol, ozone, chlorine dioxide, etc.) | Airborne Surface | No | Short | None | Yes | Yes |
| Photocatalytic disinfection | Surface | No | Controllable | UV | Yes | Yes |

Those having ordinary skill in the art will recognize that numerous modifications can be made to the specific implementations described above. The implementations should not be limited to the particular limitations described. Other implementations may be possible.

The invention claimed is:

1. A whole-body voluminous antiviral and antibacterial disinfection system, consisting of:
   a sterilization chamber adapted to allow one or more persons to stand therein, including
      a nozzle disposed in the sterilization chamber in a location proximate a lower corner of the sterilization chamber wherein fluid ejected from said nozzle avoids direct contact with eyes or face of the one or more persons;
   a tank at least partially filled with an edible photosensitizer fluid disposed outside the sterilization chamber, wherein photosensitizer aerosols are converted to reactive oxygen species (ROS) when illuminated with visible light; and
   a visible light source within the sterilization chamber adapted to flood the sterilization chamber with light.

2. The whole-body voluminous antiviral and antibacterial disinfection system of claim 1, wherein the photosensitizer aerosols are released by pressure.

3. The whole-body voluminous antiviral and antibacterial disinfection system of claim 2, wherein the pressure is generated by a compressor.

4. The whole-body voluminous antiviral and antibacterial disinfection system of claim 2, wherein the photosensitizer fluid is under pressure in the tank.

5. The whole-body voluminous antiviral and antibacterial disinfection system of claim 1 wherein the ROS is singlet oxygen ($O_2(^1\Delta_g)$).

6. The whole-body voluminous antiviral and antibacterial disinfection system of claim 5, wherein the ROS is generated from aerosols of food dye.

7. The whole-body voluminous antiviral and antibacterial disinfection system of claim 1, wherein the light source is one or more light emitting diodes (LEDs).

8. The whole-body voluminous antiviral and antibacterial disinfection system of claim 1, wherein the sterilization chamber is a room configured to have individuals dispersed therein.

9. The whole-body voluminous antiviral and antibacterial disinfection system of claim 1, wherein the sterilization chamber is a building configured to have individuals dispersed therein.

10. The whole-body voluminous antiviral and antibacterial disinfection system of claim 1, wherein the edible photosensitizer fluid is selected from the group consisting of ZnTPP, TMPyP, TPPS4, Phloxine B, Indigo Carmine, Eosin B, Eosin Y, Methylene blue, Fluorescein, and a combination thereof.

11. The Whole body voluminous antiviral and antibacterial disinfection system of claim 1, wherein the nozzle adapted to release the photosensitizer fluid in a fog-like dispersion inside the sterilization chamber to thereby generate reactive oxygen species.

* * * * *